UNITED STATES PATENT OFFICE.

ALEXR. MACPHAIL, OF JERSEY CITY, NEW JERSEY.

IMPROVED SOLUTION OF ANNOTTO.

Specification forming part of Letters Patent No. 43,034, dated June 7, 1864.

*To all whom it may concern:*

Be it known that I, ALEXANDER MACPHAIL, of Jersey City, in the county of Hudson and State of New Jersey, have invented a new and useful Improved Solution of Annotto; and I do hereby declare that the following is full, clear, and exact description thereof, which will enable others to manufacture and use the same.

Annotto in the condition in which it is ordinarily found in the retail market is much adulterated with red lead and other more or less poisonous or otherwise injurious matter.

The principal object of my invention is to obtain the coloring-matter of this substance (orelline) in a pure state and in a suitable form for giving to butter and cheese the rich yellow tint so much desired, for which purpose it has, owing to its entirely innocuous character, long been extensively used in this and other countries.

The great difficulties heretofore experienced in obtaining this coloring-matter in a desirable form for the above purposes have been the insolubility of the annotto in water, and the limited degree in which it is directly soluble in any other menstrua but alkaline solutions, and the impracticability of using alkalies in butter and cheese.

My invention consists in first dissolving the annotto by boiling in a strong alkaline solution and afterward adding alcohol to such solution, by which means the alkali, being insoluble in alcohol, is precipitated, leaving the coloring-matter of the annotto (orelline) in solution in the alcohol in a highly-concentrated state.

The alkalies which may be used are pearlash, potash, soda, lime, or any other, and the mode of manufacturing the solution is as follows: Take equal parts, by weight—say ten (10) pounds—of either of the above alkalies and ten (10) pounds of the best annotto, and boil them together in the smallest practicable quantity of water—say from two (2) to three (3) gallons for the above quantities of alkali and annotto—in a copper vessel, either over a slow steady fire or by the heat of steam suitably applied, until the alkali and annotto are thoroughly dissolved. This solution, owing to the small quantity of water used, is very thick. When the solution is complete and while it is still hot I add alcohol, ninety-five per cent., in sufficient quantity to make the whole measure ten gallons, and, having thoroughly mixed the alcohol with the alkaline solution of annotto, I place the whole in an upright barrel or other vessel and allow it to cool, and permit the precipitated alkali to settle and leave the clear alcoholic solution of annotto, which I then draw off and bottle as required.

This solution is of a very dark color, but clear and beautifully transparent, and will keep in any climate for years without deteriorating in the least degree.

Besides being suitable for the purposes hereinbefore specified, this solution will be found very useful to the confectioner and dyer and in all arts and trades in which annotto has been used as a coloring agent, and it can be manufactured at so low a price that its use will be more economical for all or most purposes than the use of annotto in any other form, besides which it is more convenient, cleanly, and pure than any other form of annotto to be found in the market.

To use the solution for the coloring of butter and cheese a few drops of it are added to the milk.

What I claim as my invention, and desire to secure by Letters Patent, as a new article of manufacture, is—

The solution of annotto obtained by a process substantially as herein specified.

ALEXANDER MACPHAIL.

Witnesses:
JAMES P. HALL,
GEO. W. REED.